June 29, 1954   W. J. STAFFE   2,682,426
VEHICLE LOAD BRACING DOG CONSTRUCTION
Filed March 26, 1952
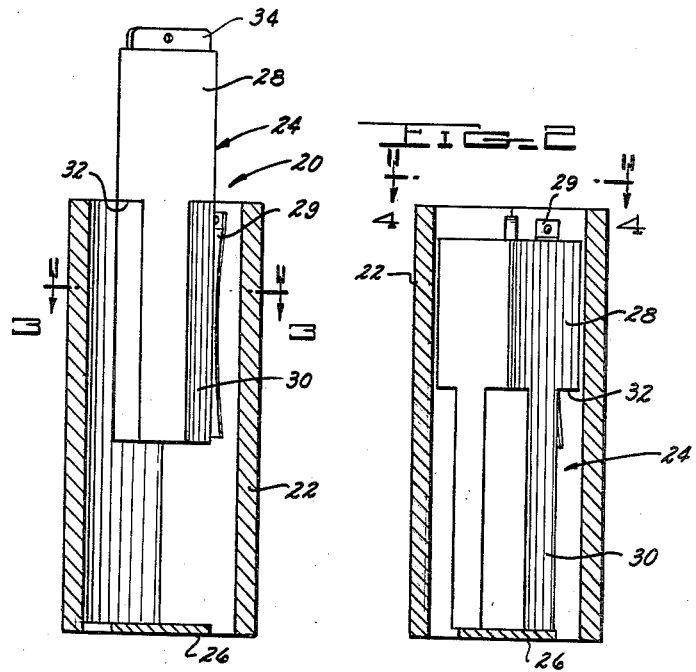
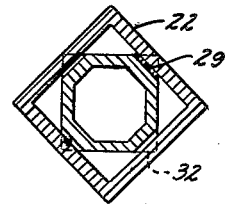
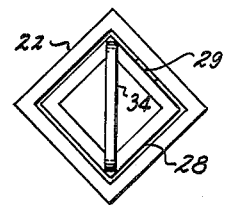
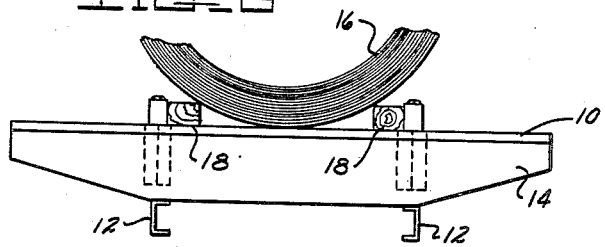
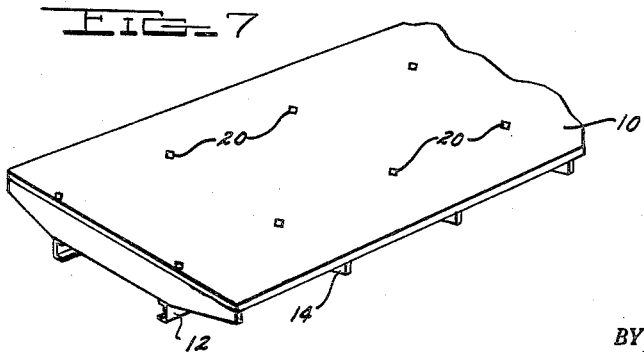
INVENTOR.
WALTER J. STAFFE
BY
ATTORNEY

Patented June 29, 1954

2,682,426

UNITED STATES PATENT OFFICE 2,682,426

VEHICLE LOAD BRACING DOG CONSTRUCTION

Walter J. Staffe, Lincoln Park, Mich.

Application March 26, 1952, Serial No. 278,695

4 Claims. (Cl. 296—43)

The present invention relates to a bracing dog construction adapted for use in trailer constructions, and more particularly to such a bracing dog construction which is used with a flat-bed trailer to position and support superstructure thereon.

It is conventional practice in hauling coils of strip steel on a flat-bed trailer to lay a pair of heavy wooden strips in spaced relation longitudinally of the trailer so that the coils of strip steel may be placed upright therebetween. The coils are then secured to the trailer structure by some suitable fastening means such as chains or the like. In trailers which have wooden beds, the wooden strips are usually nailed to the wooden beds with large spikes. The bed of the trailer is damaged and torn up when the wooden strips are pried loose to adapt the trailer bed for carrying a different type of cargo. Further, unless a special type of nailable steel deck is used, the conventional type of steel bed trailer will not readily permit the use of such nails. A construction has been sought which would permit the use of retaining members such as the usual wooden strips, and which could be used without damaging the trailer bed.

In view of this problem, it is a primary object of the present invention to provide a device particularly adapted for use with flat-bed trailers which will effectively position and support a removable superstructure without altering or damaging the bed.

It is a further object of the present invention to provide a bracing device for use with flat-bed trailers which will quickly and effectively position retaining structure on the trailer bed.

It is another object of the present invention to provide a bracing device of the above type which is an integral part of the trailer construction, and which may be quickly and easily moved from an operative position to an inoperative position or the converse.

Other objects of this invention will appear in the following description and appended claims, reference being had to the accompanying drawings forming a part of this specification wherein like reference characters designate corresponding parts in the several views.

In the drawings:

Figure 1 is an elevation of the bracing dog construction of the present invention in the operative position, part of the construction being shown in section for clarity, Fig. 2 is a view similar to Fig. 1 with the bracing dog shown in the inoperative position, Fig. 3 is a sectional view taken along the line 3—3 in the direction of the arrows, Fig. 1, Fig. 4 is a top view taken along the line 4—4 in the direction of the arrows, Fig. 2, Fig. 5 is a bottom view of the dog well of the present invention, Fig. 6 is a rear view of a flat-bed trailer utilizing the device of the present invention to retain the coils of strip steel in position, and Fig. 7 is a perspective view of a flat trailer bed with several devices of the present invention shown in the inoperative position.

Before explaining the present invention in detail it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring to the drawings, a flat trailer bed is indicated at 10. The bed is supported by the longitudinal braces 12 and the cross braces 14. The lower half of a coil of strip steel is shown at 16 in Fig. 6. The coil 16 is positioned between two strips of heavy lumber 18 which are disposed longitudinally of the trailer. This prevents the coils of strip steel from rolling sidewise of the trailer, and the coils are secured to the trailer in any suitable manner such as chains or the like. The particular method of fastening the coils to the trailer construction is not important to the present invention and is not shown.

It is necessary to hold the strips of lumber 18 in position on the trailer bed 10 and the present invention is utilized at this point. The device of the present invention comprises the assembly 20 of a well 22 and a dog 24 as shown in Figs. 1 and 2 of the drawings. Several of these assemblies 20 are positioned longitudinally of the trailer bed 10 as shown in Fig. 7. The well 22 is comprised of a substantially square metal receptacle which is open at the top and which has a retaining band 26 across the bottom thereof. The retaining band 26 keeps the dog 24 from falling through the well when the dog is in the inoperative position as shown in Fig. 2. The well 22 is affixed to the cross brace 14 of the trailer construction by welding or any other suitable means. The well is positioned so that two corners of the well are aligned parallel to the longitudinal axis of the trailer. The wells are positioned in this manner so that the dogs 24 when disposed within the well in the operative position will present a flat face to the wooden strips 18.

The dog is formed of an elongated metal blank which is substantially square in cross section. The corners of this piece of metal are cut away for a portion of its length to provide a dog having a substantially square head 28 and a polygonal extension 30 disposed therebeneath. The corner portions of the head 28 provide shoulders 32 which set across the top of the well 22 when the head 28 is turned so that it will not align with the opening in the top of the well 22. Since the well is disposed at an angle to the longitudinal axis of the trailer, a flat side of the head 28 is presented to the wooden strip 18.

When the dog 24 is disposed in the operative position as shown in Fig. 1, the faces of the polygonal extension 30 are in close proximity to the sidewalls of the well 22 as shown in Fig. 3 of the drawings. This is due to the particular configuration of the extension and keeps the dog firmly positioned within the well to prevent excessive relative movement between the dog and the well in the operative position. When the dog is stored within the well the faces of the head 28 are in close proximity to the sidewalls of the well 22 to prevent excessive relative movement between the dog and well in the stored or inoperative position as shown in Fig. 4.

Suitable means are provided between the walls of the well 22 and the faces of the head 28 of the dog 24 to prevent rattling when the dog 24 is stored in the inoperative position and the vehicle is in motion. One such means which has been found satisfactory is a finger spring indicated at 29 in the drawings. The finger spring 29 is affixed to a wall of the well 22. Thus, when the dog 24 is stored within the well 22, the spring 29 engages one face of the head 28 as shown in Figs. 2 and 9 of the drawings. Of course, any desired number of such springs may be used depending on the relative sizes of the dog and well and the force required to be exerted therebetween.

After the coils of steel are unloaded from the trailer bed and it is desired to remove the wooden strips 18, each of the dogs 24 is lifted by the handle 34 provided thereon and turned until the square head 28 aligns with the square opening in the top of the well 22. The dog 24 is then dropped into the well and the extension 30 rests upon the band 26 in the bottom of the well 22 as shown in Fig. 2 of the drawings.

Thus, it will be seen that the present invention provides a means for positioning and supporting a superstructure such as the wooden strips 18 on the flat bed of a trailer. The device is provided integral with the trailer frame and the dogs may be quickly and easily stored to the inoperative position without damaging the trailer bed. The trailer bed regains its flat contour and a maximum load of easily damaged items such as asphalt tile, roofing, bags of cement, or the like may be carried without the danger of damage thereto from a splintered or damaged deck.

Having thus described my invention, I claim:

1. In combination with a flat bed vehicle having a frame structure with a flat bed thereon and an opening in said bed, a bracing dog construction comprising an elongated well which is substantially square in cross section secured to the vehicle frame structure beneath the opening in said bed, said well being open at the top and having closure means at the bottom thereof, and a dog adapted to be stored in the well in the inoperative position, said dog comprising an elongated metal blank which is substantially square in cross section and is slightly smaller than the opening in said well, the corners of said metal blank being cut away for a portion of its length to provide a substantially square head having shoulders thereon and a polygonal extension therebeneath, said dog being stored in the inoperative position entirely within said well when the head thereof is aligned with the opening of said well and being securely positioned with the head protruding above the opening in the bed when the head is misaligned with the well opening so that the shoulders of said head engage the top of said well.

2. In combination with a flat bed trailer adapted to carry coils of steel between a pair of spaced supports disposed longitudinally of said trailer and having a frame structure with a flat bed thereon and a plurality of openings in said bed, a bracing construction comprising a plurality of elongated wells which are substantially square in cross section secured to the vehicle frame structure one beneath each of the openings in said bed, each of said wells being open at the top and having closure means at the bottom thereof and being so positioned that two corners thereof substantially align with the longitudinal axis of the trailer, and a plurality of dogs one adapted to be stored in each of the wells in the inoperative position, each of said dogs comprising an elongated metal blank which is substantially square in cross section and is slightly smaller than the opening in said well, the corners of said metal blank being cut away for a portion of its length to provide a substantially square head having shoulders thereon and an octagonal extension therebeneath, said dog being stored in the inoperative position entirely within said well in close proximity to the sidewalls thereof when the head of the dog is aligned with the opening of said well, and when rotated to the operative position so that the head is not aligned with the opening in said well, being supported on its shoulders by the well with the head extending out of said well above said vehicle bed, and said octagonal extension extending into said well in close proximity to the side walls of said well, the said head presenting a flat surface along the longitudinal axis of the trailer in the operative position so as to provide a brace for one of the supports.

3. In combination with a flat bed vehicle having a frame structure with a flat bed thereon, a bracing dog construction comprising an elongated well which is polygonal in cross section secured to the vehicle frame structure and extending below the level of the bed, said well being open at the top and having means to prevent the dog from passing out the bottom of the well, and a dog adapted to be stored in the well in the inoperative position, said dog comprising an elongated metal blank having a polygonal head thereon and a shank depending therebeneath which is of less cross sectional area than said head to provide shoulders adjacent said head, said dog being stored in the inoperative position entirely within said well when the head thereof is aligned with the opening of said well and being securely positioned with the head protruding above the surface of the bed when the head is misaligned with the well opening so that the shoulders of the said misaligned head engage the top of said well.

4. In combination with a flat bed vehicle having a frame structure with a flat bed thereon, a bracing dog construction comprising an elongated well which is rectangular in cross section and which has two corners thereof substantially aligned with the longitudinal axis of the vehicle secured to the vehicle frame structure and extending below the level of the bed, said well being open at the top and having means to prevent the dog from passing out the bottom of the well, and a dog adapted to be stored in the well in the inoperative position, said dog comprising an elongated metal blank having a polygonal head thereon and a shank depending therebeneath which is of less cross sectional area than said head, said dog being stored in the inoperative position entirely within said well when the head thereof is aligned with the opening of said well and being securely positioned with the head protruding above the top of the well when the head is misaligned with the well opening so that said misaligned head engages the top of said well and provides a flat surface along the longitudinal axis of the vehicle in the operative position.

References Cited in the file of this patent

UNITED STATES PATENTS

| Number | Name | Date |
|---|---|---|
| 842,638 | Edwards | Jan. 29, 1907 |
| 878,452 | Bleckley | Feb. 4, 1908 |
| 904,943 | Dodge | Nov. 24, 1908 |
| 919,447 | Marsh | Apr. 27, 1909 |
| 1,240,006 | Austin | Sept. 11, 1917 |
| 2,471,096 | Colorigh | Nov. 10, 1947 |
| 2,541,274 | Nixon | Feb. 13, 1951 |